United States Patent
Miyashita (10) Patent No.: US 7,495,855 B2
(45) Date of Patent: Feb. 24, 2009

(54) APPARATUS AND METHOD FOR READING AND WRITING DATA IN RECORDING MEDIUM

(75) Inventor: Youichi Miyashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 230 days.

(21) Appl. No.: 11/044,371

(22) Filed: Jan. 27, 2005

(65) Prior Publication Data

US 2006/0082914 A1    Apr. 20, 2006

(30) Foreign Application Priority Data

Oct. 20, 2004   (JP)   ............... 2004-306088

(51) Int. Cl.
*G11B 5/09*      (2006.01)
*G11B 27/36*     (2006.01)

(52) U.S. Cl. ............... 360/51; 360/31; 360/48

(58) Field of Classification Search ............ None
See application file for complete search history.

(56) References Cited

U.S. PATENT DOCUMENTS 5,535,067 A * 7/1996 Rooke .................. 360/51
6,122,122 A   9/2000 Yoshida
6,310,742 B1 * 10/2001 Nazarian et al. ......... 360/77.04
6,839,195 B2 * 1/2005 Chainer et al. ............... 360/51
2004/0184393 A1 * 9/2004 Kim et al. ............... 369/275.3
2004/0201913 A1 * 10/2004 Sutardja .................... 360/51

FOREIGN PATENT DOCUMENTS

| JP | 8-255465 | 10/1996 |
| JP | 11-031358 | 2/1999 |
| JP | 11-328843 | 11/1999 |

* cited by examiner

*Primary Examiner*—Joseph H Feild
*Assistant Examiner*—Daniell L Negrón
(74) *Attorney, Agent, or Firm*—Greer, Burns & Crain, Ltd.

(57) ABSTRACT

In a medium recording playback apparatus, a write linking position judging unit judges whether a servo frame for reading/writing data is in a servo write linking position. If the servo frame is not in the servo write linking position, a data reading/writing unit reads/writes data using a medium synchronous write function. The medium synchronous write function corrects a frequency of a clock used to play back a timing of reading/writing the data, based on a distance between servo synchronous marks.

8 Claims, 11 Drawing Sheets

APPARATUS AND METHOD FOR READING AND WRITING DATA IN RECORDING MEDIUM

BACKGROUND OF THE INVENTION

1) Field of the Invention

The present invention relates to a technology for more effectively recording and playing-back information in and from a recording medium.

2) Description of the Related Art

In conventional magnetic disk apparatus, servo information may be erased when a speed of a recording medium deviates from its standard speed, or when a data write starting position shifts due to rotational variation and decentering of the recording medium. To avoid erasing of the servo information due to such factors, gaps are provided in a recording medium.

Figure 9A:
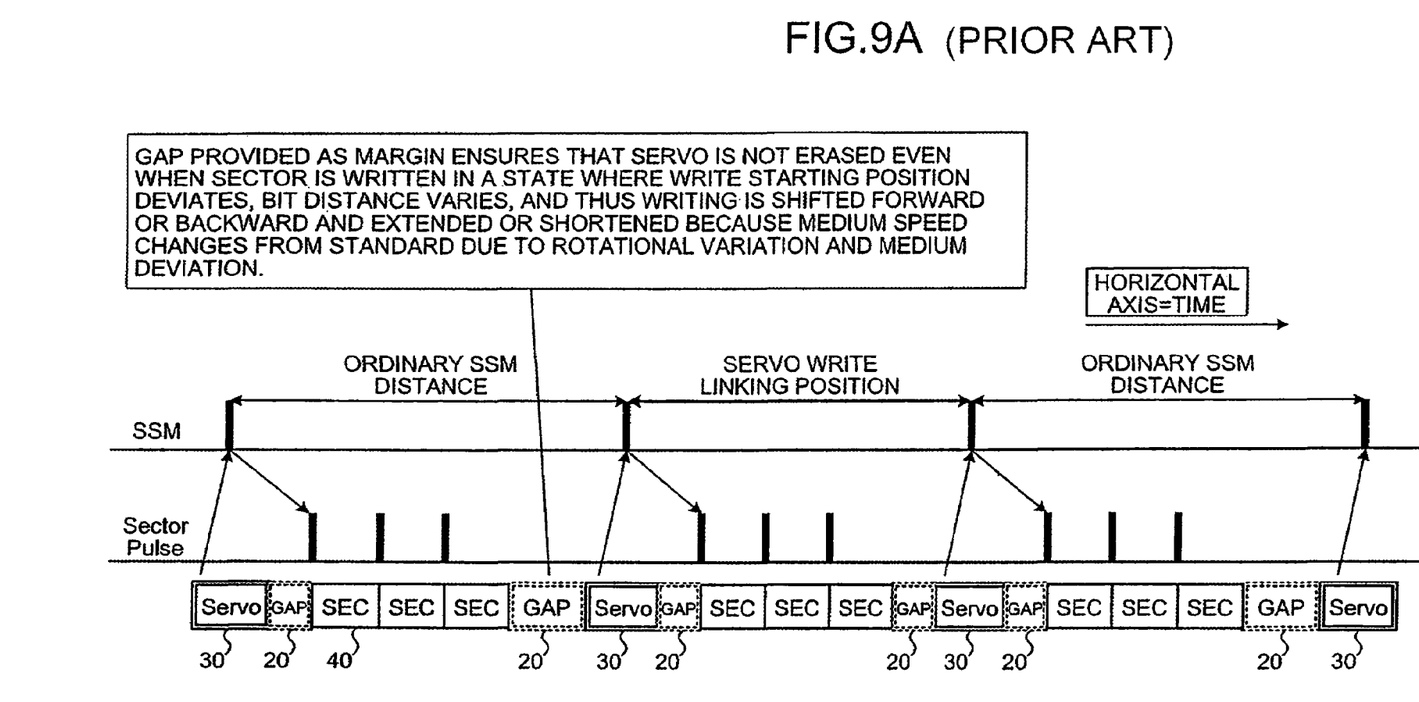
FIG. 9A illustrates a conventional recording format in a magnetic disk apparatus.

FIG. 9A illustrates a conventional recording format in a magnetic disk apparatus. As shown in FIG. 9A, a servo frame delimited by SSMs includes a Servo (servo information) 30, sectors (SECs) 40, and GAPs (GAPs) 20, and is structured such that the servo information is not overwritten even when a data write starting position shifts.

In other words, sector pulses are generated at predetermined timing after an SSM is detected, and the data is written with reference to the sector pulses. Even if the generation timing of the sector pulse shifts, the GAP 20 ensures that the Servo 30 is not overwritten.

However, when many GAPs 20 are provided in the recording medium, sector lengths shorten, whereby format efficiency reduces, or there is a need to increase recording density. Japanese Patent Application Laid-Open Publication No. 1999-31358 discloses a disk synchronous write system in which the GAPs 20 are eliminated, a distance between servos is measured using the servo synchronous marks, a variation in the number of revolutions of the recording medium is determined, and timing signals for an optimum read gate and write gate are generated accordingly, thereby enhancing the format efficiency.

Figure 9B:
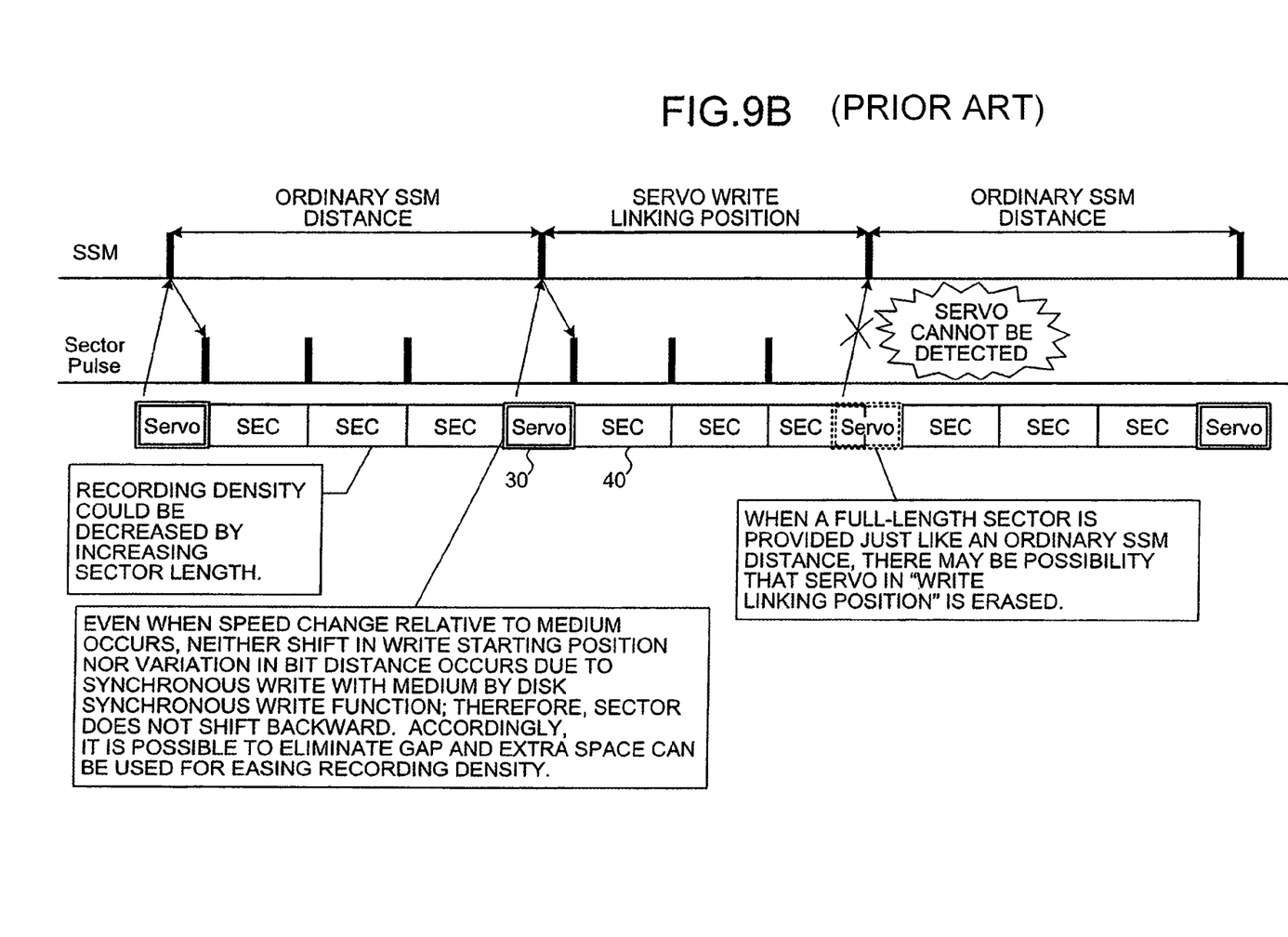
FIG. 9B illustrates a recording format when a disk synchronous write system is used.

FIG. 9B illustrates a recording format in a magnetic disk apparatus that uses the disk synchronous write system. As shown in FIG. 9B, when the disk synchronous write system is utilized, write is executed in synchronization with the recording medium, and therefore, variations in write position are eliminated, thereby making it possible to remove the GAPs 20 shown in FIG. 9A. As the result, the SEC 40 can be made longer, thereby enhancing the recording density.

However, when the SSMs on a track are equidistant, after one rotation of the track, extra or insufficient space is generated at the last servo frame, which is a servo write linking position. FIG. 9B illustrates a case in which an insufficient space is generated in the servo write linking position, resulting in a shorter distance between the SSMs. As in this case, when the distance between SSMs becomes shorter in a servo write linking position, there is a possibility that the next Servo 30 is erased.

Figure 9C:
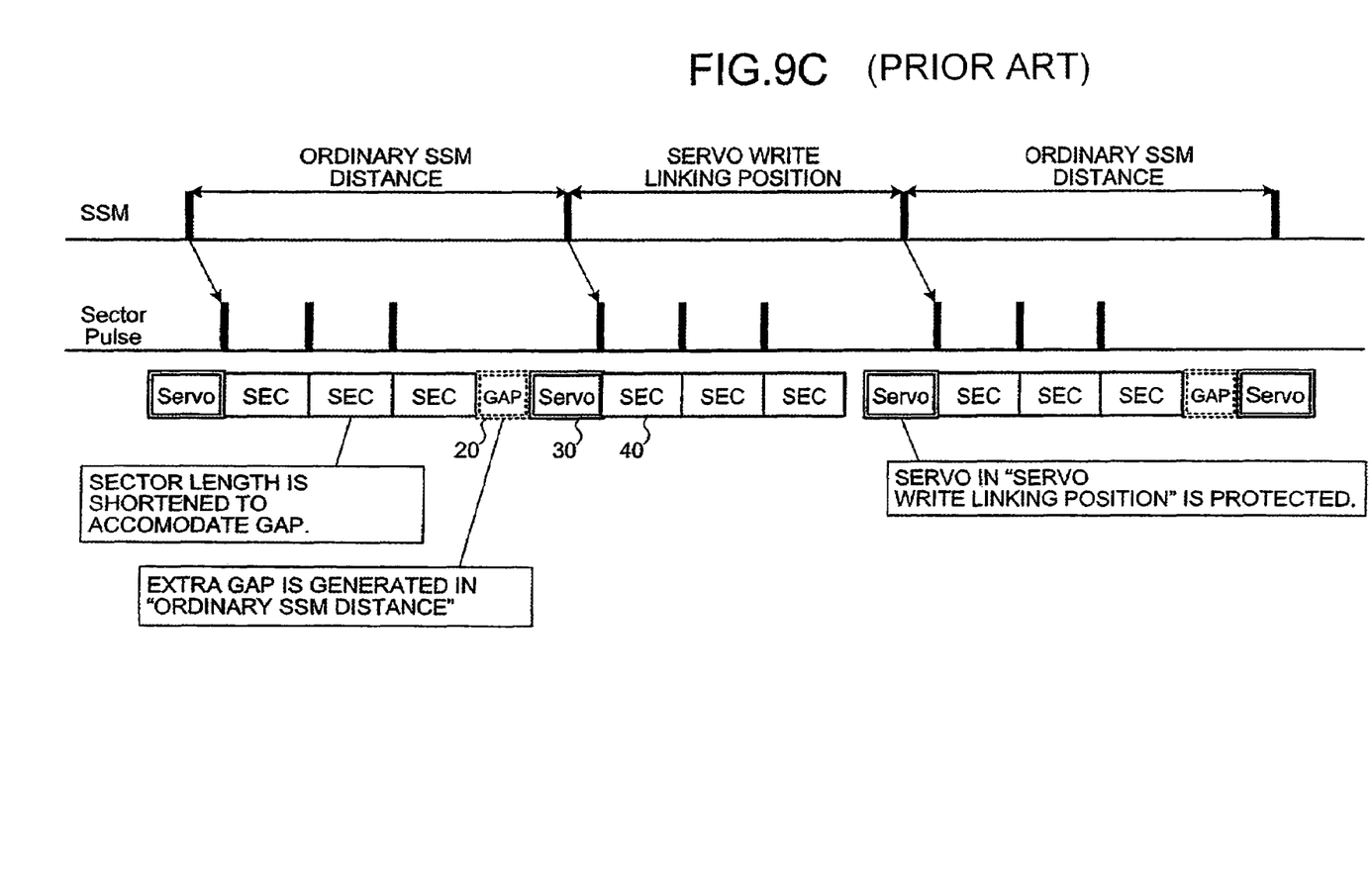
FIG. 9C illustrates another recording format when GAPs are provided to protect write linking, and when the disk synchronous write system is used.

Thus, even when the disk synchronous write system is used, a GAP 20 is provided in consideration that a distance between SSMs may become shorter in a servo write linking position. FIG. 9C illustrates a recording format in a magnetic disk apparatus in which the disk synchronous write system is used, and GAPs 20 are provided to protect write linking. As shown in FIG. 9C, although the GAP is smaller compared with that of the conventional recording format shown in FIG. 9A, the GAPs 20 are provided.

However, GAPs 20 that are provided in ordinary positions other than the servo write linking position to protect the servo write linking position, prove unnecessary. Moreover, the sector length becomes shorter, which gives rise to a problem that there is a need to increase the recording density to maintain recording capacity.

SUMMARY OF THE INVENTION

It is an object of the present invention to at least solve the problems in the conventional technology.

A medium recording and playback apparatus according to an aspect of the present invention includes a write linking position judging unit that judges whether a servo frame for reading/writing data is in a servo write linking position; and a data reading/writing unit that reads/writes the data using a medium synchronous write function, if the write linking position judging unit judges that the servo frame is not in the servo write linking position. The medium synchronous write function corrects a frequency of a clock used to play back a timing of reading/writing the data, based on a distance between servo synchronous marks.

A medium recording and playback method according to another aspect of the present invention is applied to a medium recording and playback apparatus and includes judging whether a servo frame for reading/writing data is in a servo write linking position; and reading/writing the data using a medium synchronous write function, if it is judged at the judging that the servo frame is not in the servo write linking position. The medium synchronous write function corrects a frequency of a clock used to play back a timing of the reading/writing, based on a distance between servo synchronous marks.

A computer program product according to still another aspect of the present invention implements on a computer a medium recording and playback method that includes judging whether a servo frame for reading/writing data is in a servo write linking position; and reading/writing the data using a medium synchronous write function, if it is judged at the judging that the servo frame is not in the servo write linking position, wherein the medium synchronous write function corrects a frequency of a clock used to play back a timing of the reading/writing, based on a distance between servo synchronous marks.

An information recording medium according to still another aspect of the present invention includes a plurality of servo frames, wherein a recording format of a servo frame in a servo write linking position is different from a recording format of other servo frames.

The other objects, features, and advantages of the present invention are specifically set forth in or will become apparent from the following detailed description of the invention when read in conjunction with the accompanying drawings.

DETAILED DESCRIPTION

Exemplary embodiments of the present invention are explained in detail with reference to the accompanying drawings. The present embodiment is explained by concentrating on a case in which the present invention is applied to a magnetic disk apparatus. However, the present invention is not limited to this embodiment, and can also be applied in a similar manner, to a medium recording and playback apparatus that has a medium synchronous write function corresponding to a disk synchronous write function.

Figure 1:
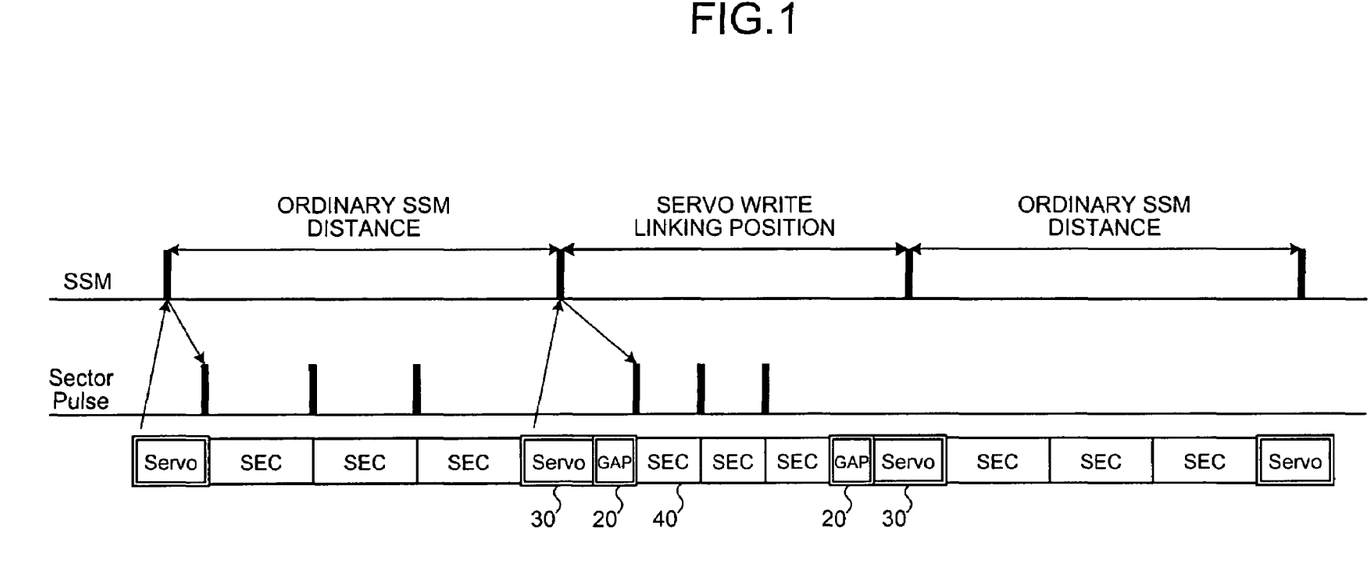
FIG. 1 is a detailed diagram to explain a recording format of a magnetic disk apparatus according to the present embodiment.

First, a recording format of the magnetic disk apparatus according to the present embodiment is explained. FIG. 1 is a detailed diagram to explain the recording format of the magnetic disk apparatus according to the present embodiment.

As shown in FIG. 1, in this recording format, an ordinary servo frame is in a format that uses a disk synchronous write system shown in FIG. 9B, and a servo linking position is in a conventional format that does not use the disk synchronous write system.

In other words, in the ordinary servo frame, no GAP 20 is provided, thereby making the length of the SEC 40 longer, and the GAPs 20 are provided in a servo write linking position, thereby making the length of the SEC 40 shorter. Therefore, the magnetic disk apparatus according to the present embodiment uses the disk synchronous write system in the ordinary servo frame, and carries out data read/writes at a high frequency specifically meant for a servo write linking position without using the disk synchronous write system, in the servo write linking position.

In this manner, the magnetic disk apparatus according to the present embodiment is not provided with any GAP 20 in an ordinary servo frame, and is provided with the GAPs 20 only in the servo write linking position, thereby making it possible to reduce the proportion occupied by the GAP 20, and to ease the recording density.

Figure 2:
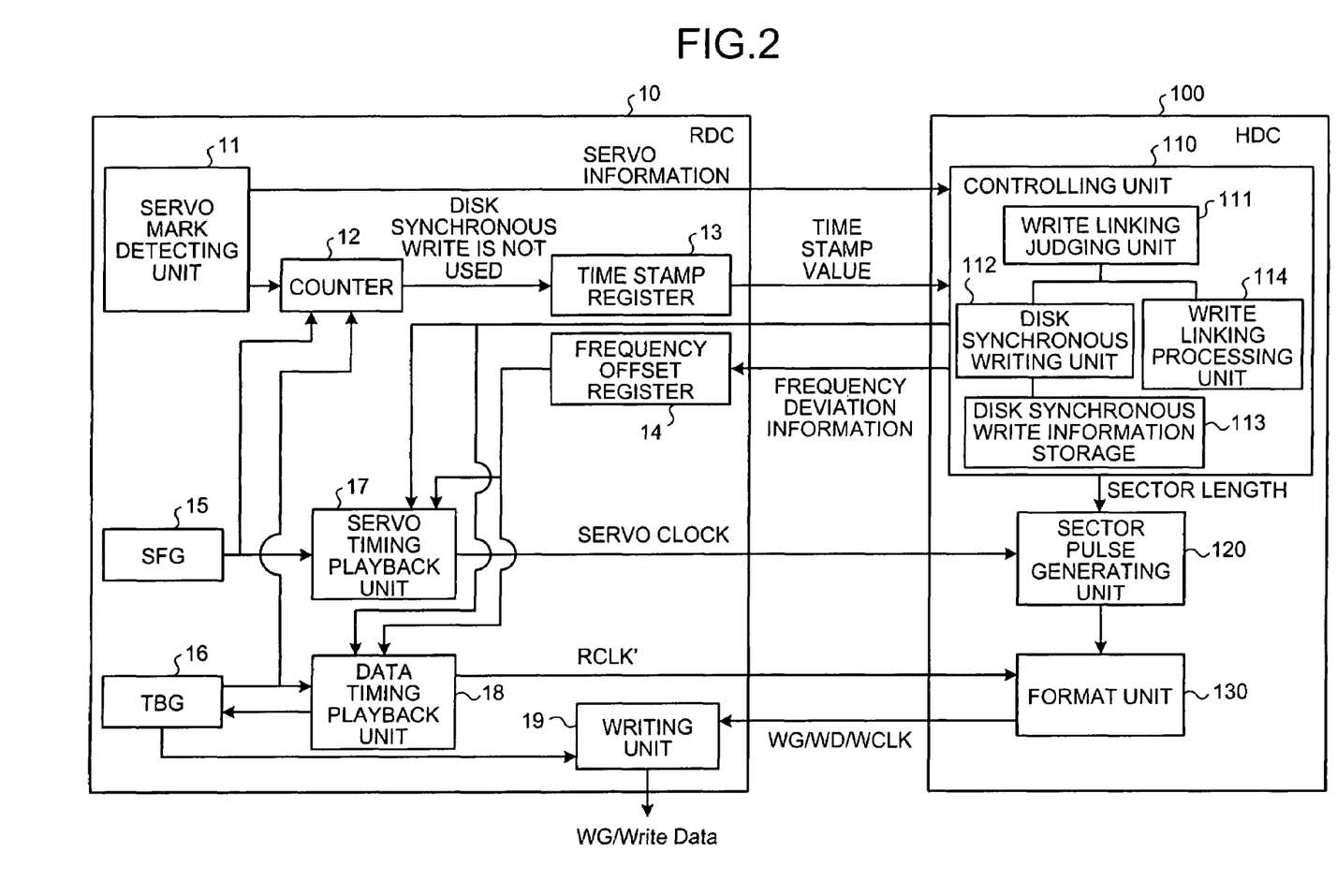
FIG. 2 is a functional block diagram of structures of an RDC and an HDC of the magnetic disk apparatus.

Next, a structure of a read channel (radical distribution control (RDC)) and a controller (hard disk controller (HDC)) of the magnetic disk apparatus according to the present embodiment are explained. FIG. 2 is a functional block diagram of structures of the RDC and the HDC of the magnetic disk apparatus.

As shown in FIG. 2, an RDC 10 of this magnetic disk apparatus includes a servo mark detecting unit 11, a counter 12, a time stamp register 13, a frequency offset register 14, a servo frequency generator (SFG) 15, a time base generator (TBG) 16, a servo timing playback unit 17, a data timing playback unit 18, and a writing unit 19.

The servo mark detecting unit 11 detects SSMs. When an SSM is detected, the servo mark detecting unit 11 passes a Servo 30 including the detected SSM to an HDC 100, and posts the detection of the SSM to the counter 12.

The counter 12 is a 16-bit counter to count up at eight-fold speed of the frequency of signals generated by the SFG 15, and when the detection of SSM is posted from the servo mark detecting unit 11, a count value is set in the time stamp register 13.

The time stamp register 13 stores a value counted by the counter 12 at the time of SSM detection, as a time stamp value. The HDC 100 reads out the time stamp register 13.

The frequency offset register 14 is a register in which the HDC 100 sets frequency deviation information, that is, information relating to frequency deviation of data read/write caused by rotational variation or decentering of a recording medium. The HDC 100 computes the frequency deviation information from the distance between SSMs, and sets the frequency deviation information in the frequency offset register 14.

The SFG 15 is a signal generating unit to generate a servo clock of a predetermined frequency. The TBG 16 is a signal generating unit to generate clock that is used for data read/write.

The servo timing playback unit 17 plays back generation timing of a sector pulse. Specifically, the servo timing playback unit 17 corrects a servo clock generated by the SFG 15, based on the frequency deviation information set in the frequency offset register 14, and supplies the corrected servo clock to the HDC 100. Further, when the HDC 100 instructs that the disk synchronous write is not used, the servo timing playback unit 17 generates a servo clock of a predetermined frequency for write linking position.

The data timing playback unit 18 plays back timing at which data read/write is carried out. Specifically, the data timing playback unit 18 corrects the clock generated by the TBG 16, based on the frequency deviation information set in the frequency offset register 14, and supplies the corrected clock (RCLK') to the HDC 100.

The data timing playback unit 18 generates a clock of the predetermined frequency for write linking position, when the HDC 100 instructs that the disk synchronous write is not used. Besides this, the data timing playback unit 18 passes information relating to the generated clock to the TBG 16, and the TBG 16 supplies the corrected clock to the writing unit 19.

The writing unit 19 writes data using the corrected clock received from the TBG 16, and writes timing designation (WG/WD/WCLK) received from the HDC 100.

The HDC 100 includes a controlling unit 110, a sector pulse generating unit 120, and a format unit 130.

The controlling unit 110 judges whether a servo frame is in a servo write linking position, based on the Servo 30 received from the RDC 10, allows the RDC 10 to operate the disk synchronous write function when the servo frame is not in the servo write linking position, and carries out data read/write using a high frequency specifically meant for write linking position when the servo frame is in the servo write linking position. The controlling unit 110 includes a write linking judging unit 111, a disk synchronous writing unit 112, a disk synchronous write information storage unit 113, and a write linking processing unit 114.

Figure 3:
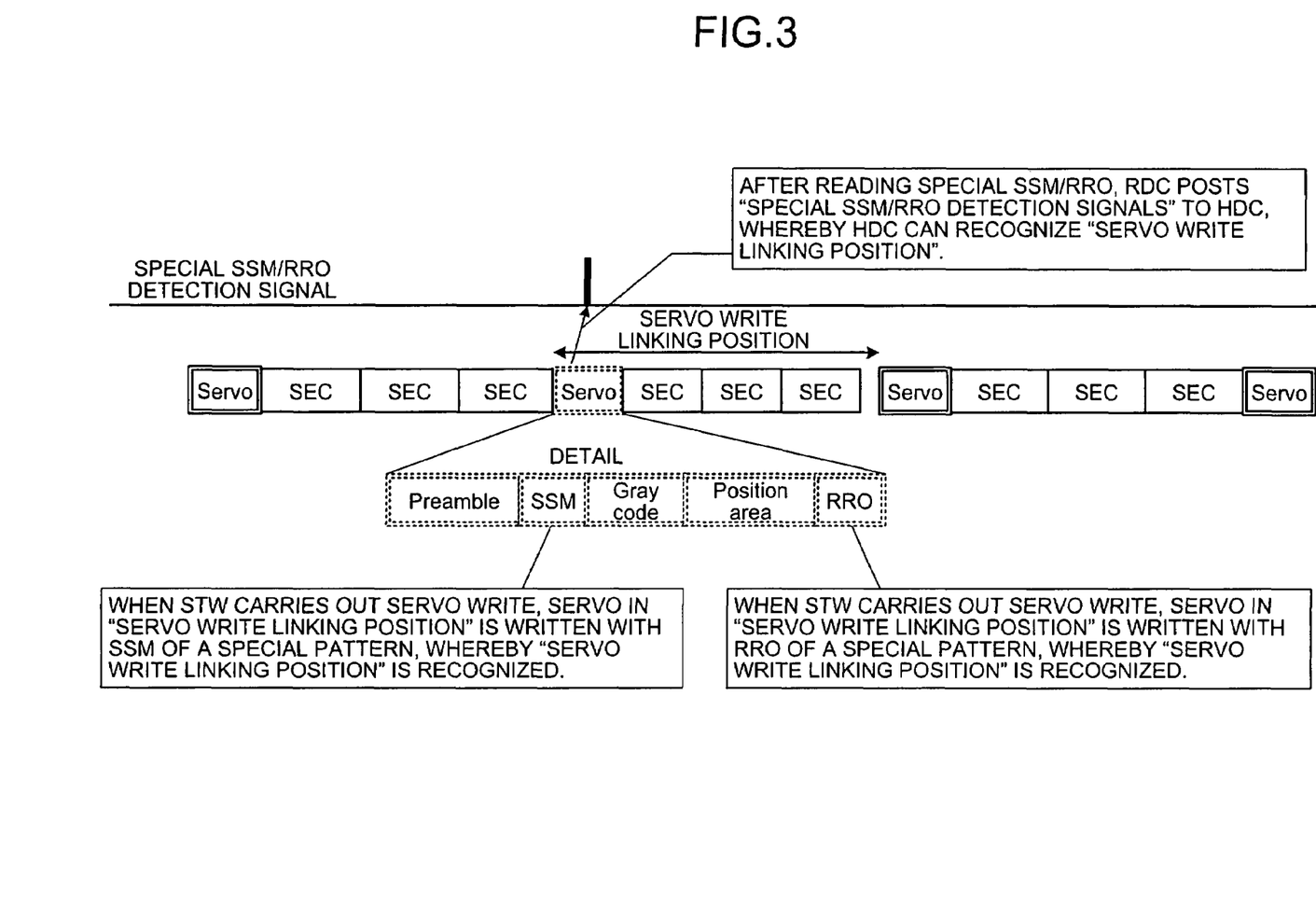
FIG. 3 is a detailed diagram of a Servo used for identifying a servo write linking position.

The write linking judging unit 111 judges whether the servo frame is in the servo write linking position, after receiving the Servo 30 from the RDC 10. FIG. 3 is a detailed diagram of the Servo 30 used for identifying a servo write linking position.

As shown in FIG. 3, the Servo 30 includes a Preamble, an SSM, a Gray code, a Position area, and a repeatable run out (RRO). The Preamble is a portion to be used for lead-in of frequency, the Gray code represents position information, the Position area represents deviation of servo information, and the RRO represents decentering information.

When the servo frame is in a servo write linking position, a servo track writer (STW) writes a special pattern, different from the patterns of other SSMs, for the SSM. Therefore, depending on whether the SSM is of the special pattern, the write linking judging unit 111 can judge whether the servo frame is in a servo write linking position.

As a technique to demonstrate that a servo frame is in a servo write linking position, the servo frame can be shown in a servo write linking position using part of the RRO in place of using the special pattern for the SSM. In addition, the SSM of the servo frame located ahead of the servo write linking position by a specific number of servo frames can also be made of a special pattern, instead of making the SSM of the Servo 30 in a servo write linking position of the special pattern.

The disk synchronous writing unit 112 processes disk synchronous write necessary for operating the disk synchronous write function of the RDC 10 with respect to the servo frame that has been judged not to be in a servo write linking position by the write linking judging unit 111. Specifically, this disk synchronous writing unit 112 obtains frequency deviation information based on the distance between the SSMs, and sets the frequency deviation information to the frequency offset register 14 of the RDC 10 as the disk synchronous write process.

The disk synchronous write information storage unit 113 stores data necessary for the disk synchronous writing unit 112 to obtain the frequency deviation information, and stores past time stamp values, various constants, history data, and the like.

The write linking processing unit 114 instructs the RDC 10 to carry out data read/write using the predetermined frequency for write linking position, with respect to the servo frame that has been judged to be in the servo write linking position by the write linking judging unit 111. Specifically, the write linking processing unit 114 instructs the servo timing playback unit 17 and the data timing playback unit 18 of the RDC 10 to use a clock of a high frequency specifically meant for write linking position, without using the frequency offset register 14.

In this manner, the write linking judging unit 111 judges whether the servo frame is in the servo write linking position, depending on whether the SSM is of a special pattern. When the servo frame is not in the servo write linking position, the disk synchronous writing unit 112 allows the disk synchronous write function of the RDC 10 to be operated. When the servo frame is in the servo write linking position, the write linking processing unit 114 instructs the RDC 10 to carry out data read/write using the predetermined frequency for write linking position, thereby making it possible to reduce a proportion occupied by the GAP 20.

The sector pulse generating unit 120 is a signal generating unit that counts servo clocks input from the RDC 10, to generate sector pulses. When the disk synchronous write function is operated, the sector pulse generating unit 120 inputs the servo clock corrected by the servo timing playback unit 17 using the frequency offset register 14, and when the disk write function is not operated the servo timing playback unit 17 inputs the servo clock of the predetermined frequency for servo write linking position.

The format unit 130 instructs the RDC 10 about timing of writing data in a recording medium using the sector pulses generated by the sector pulse generating unit 120.

Next, a process procedure of the controlling unit 110 of the HDC 100 is explained with reference to a flowchart in FIG. 4. Here, a processing procedure in a case where the Nth servo frame from the SSM of the special pattern is in a servo write linking position is explained.

Figure 4:
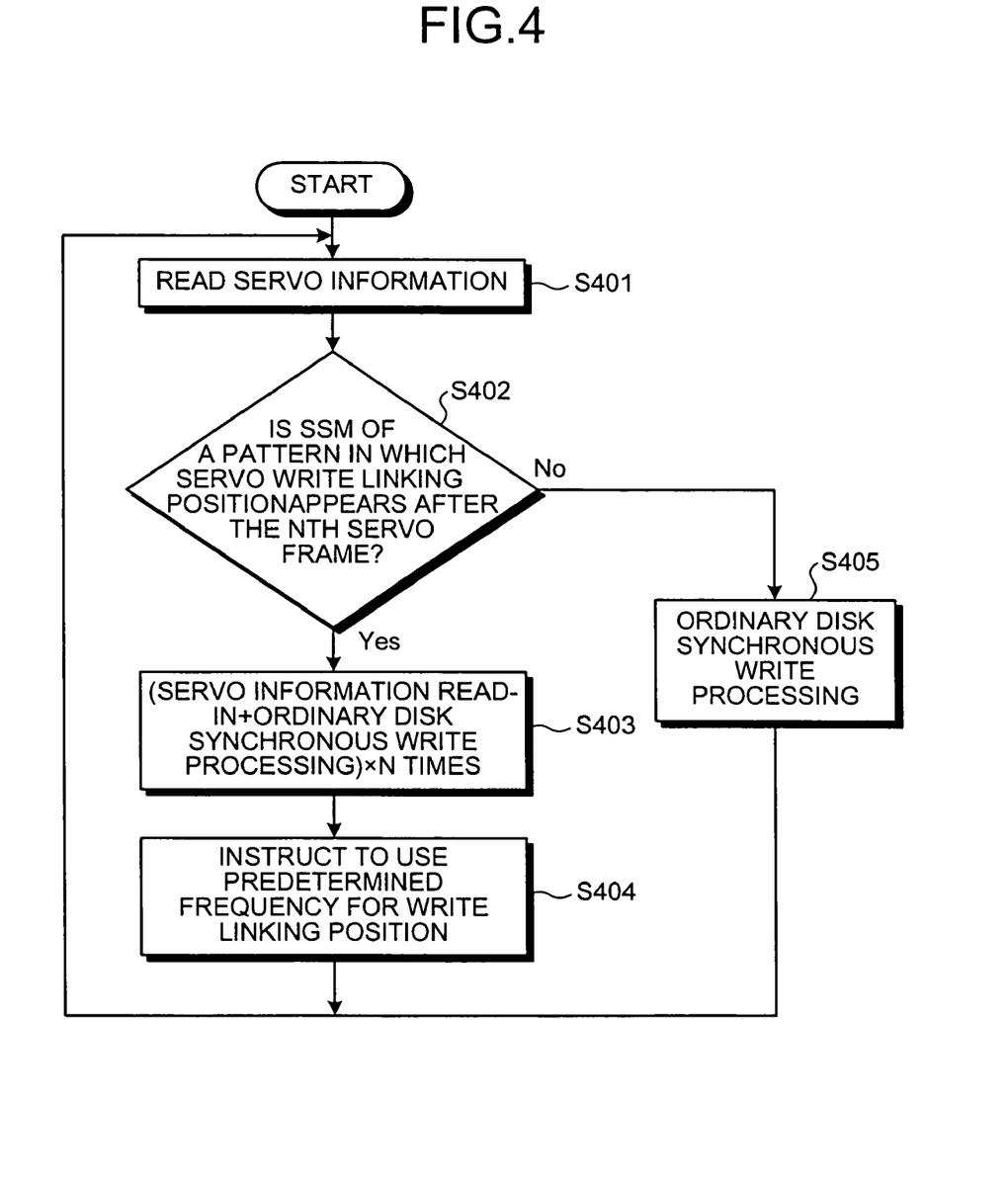
FIG. 4 is a flowchart of a process procedure of a controlling unit of the HDC.

As shown in FIG. 4, in the controlling unit 110, the write linking judging unit 111 reads servo information from the RDC 10 (step S401), and judges whether the servo frame, that is the Nth position after the present servo frame, is in the servo write linking position, using the SSM pattern (step S402).

As a result, when the write linking judging unit 111 detects the SSM pattern specifying that the Nth servo frame from the present servo frame is in the servo write linking position, the write linking judging unit 111 repeats read of servo information and disk synchronous write processing by the disk synchronous writing unit 112 N times (step S403). Then the write linking processing unit 114 instructs the RDC 10 to carry out data read/write using the predetermined frequency for write linking position (step S404). Next, the write linking judging unit 111 returns to the step S401, and reads the next servo information.

On the other hand, when the write linking judging unit 111 does not detect the SSM pattern specifying that the Nth servo frame from the present servo frame is in the servo write linking position, the disk synchronous writing unit 112 carries out disk synchronous write processing (step S405), and the write linking judging unit 111 returns to the step S401 to read the next servo information.

In this manner, the write linking judging unit 111 judges whether the Nth servo frame is in the servo write linking position depending on whether the SSM is in a special pattern. When the servo frame is not in the servo write linking position, the disk synchronous writing unit 112 allows the disk synchronous write function of the RDC 10 to be operated, and when the servo frame is in the servo write linking position, the write linking processing unit 114 instructs the RDC 10 to carry out data read/write using the predetermined frequency for write linking position, thereby eliminating the GAP 20 from the ordinary servo frame.

Next, a process procedure of a disk synchronous write process executed by the disk synchronous writing unit 112 is explained with reference to a flowchart in FIG. 5. Here, the following symbols are used.

Count value of ideal SSM distance: N_smi_idl=time of ideal SSM distance×SFG frequency×8

Quotient after dividing count value of ideal SSM distance by $2^{16}$:

NM_smi=N_smi_idl/$2^{16}$

Variation allowable count value: N_err_max=N_smi_idl× allowable error (e.g. 0.05%)

Resolution of frequency offset:

S_flp_lsb=1.90625 ppm=1.90625×$10^{-6}$

Average number of SSM distance errors: N_ave=10

Figure 5:
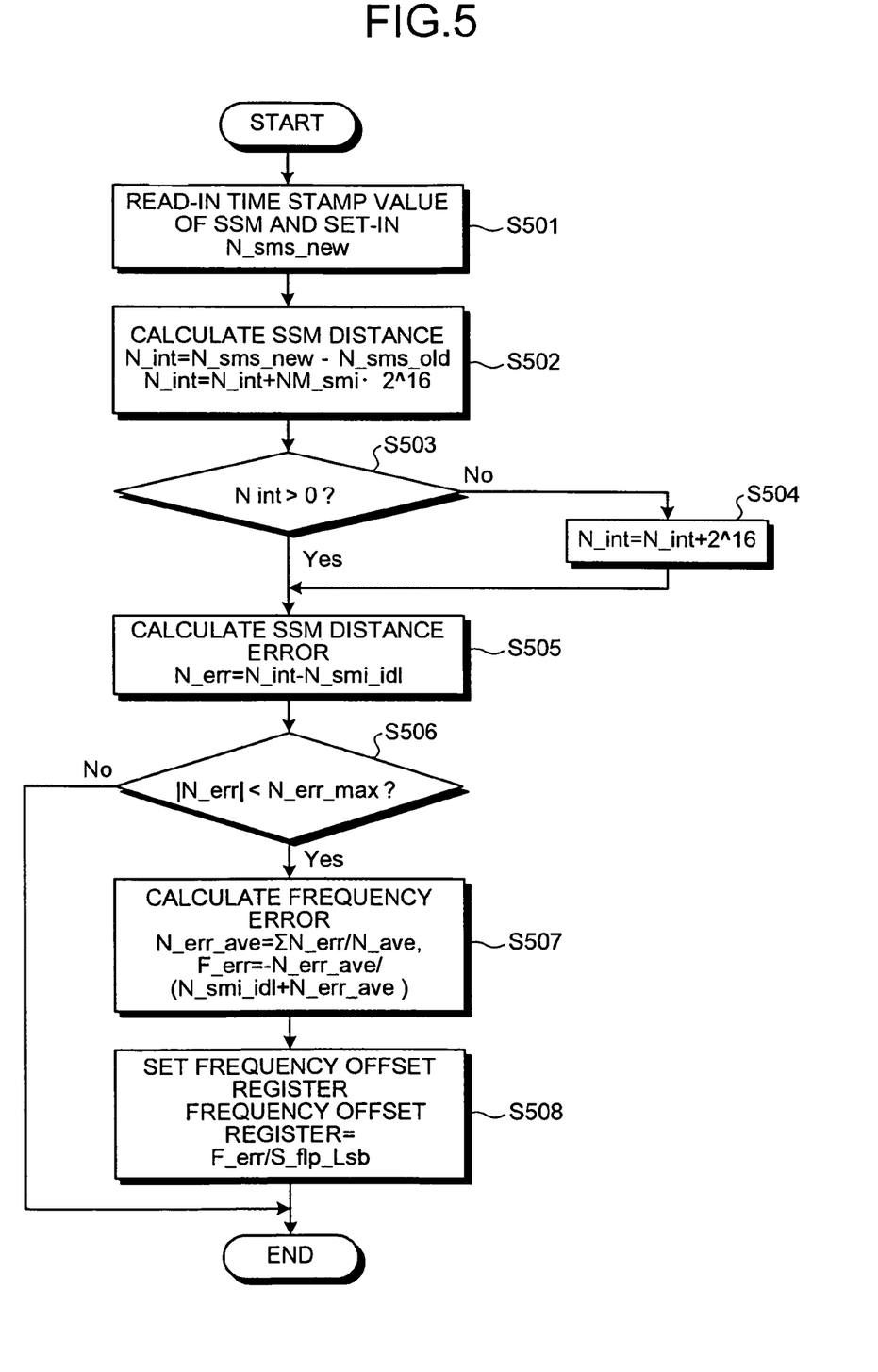
FIG. 5 is a flowchart of a process procedure of a disk synchronous write process executed by a disk synchronous writing unit.

As shown in FIG. 5, in this disk synchronous write processing, a time stamp value of the SSM is read out from the time stamp register 13 of the RDC 10, and N_sms_new is set in (step S501). Then SSM distance N_int is calculated. That is, N_int=N_sms_new−N_sms_old N_int=N_int+NM_smi×$2^{16}$ are calculated (step S502), where N_sms_old is a time stamp value that is read immediately before the present time stamp value, and N_int=N_int+NM_smi×2^16 is considered for a case where the value counted by the 16-bit counter 12 exceeds the maximum value.

Then, to confirm 0<N_int<2^16, judgment of N int>0 is carried out (step S503), and when N_int>0 is false, N_int=N_int+2^16 is set (step S504).

Then, SSM distance error, N_err, is calculated, that is an error deviating from the ideal value of SSM. In other words, N_err=N_int−N_smi_idl is calculated (step S505). Here, N_smi_idl (ideal SSM distance) is determined by calculation, or is a stored value that is an average of SSM distances measured from one to N times in advance.

Next, it is judged whether the SSM distance error, N_err, is smaller than the allowable value, N_err_max, that is, whether |N_err|<N_err_max (step S506). If the SSM distance error N_err is not within the allowable range, the frequency offset register 14 is not set. A retry operation and the like are carried out at the time of reading/writing.

On the other hand, if the SSM distance error N_err is within the allowable range, a frequency error rate F_err is calculated using the following equation (step S507).

Average value of SSM distance error N_err_ave=ΣN_err/N_ave

Frequency error rate F_err=−N_err_ave/(N_smi_idl+N_err_ave)

Figure 6:
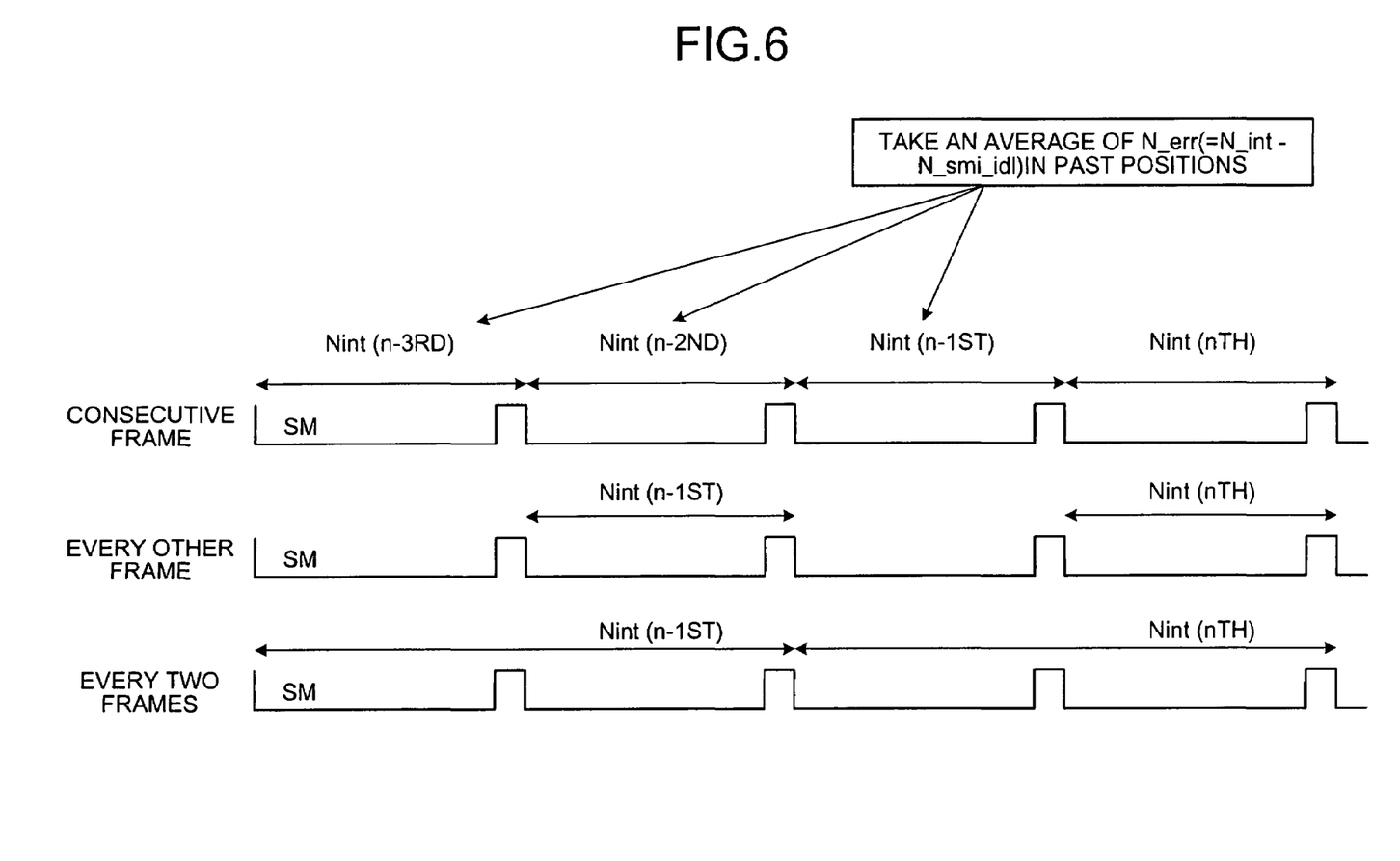
FIG. 6 illustrates a method of calculating an average value of SSM distance errors.

Here, N_err_ave is an average value of the past SSM distance errors, and the influence of the measurement fluctuation reduces by taking an average. As a calculation method for determining the average value, as shown in FIG. 6, it is possible to measure the SSM distances by decreasing frequency of the measurement of the SSM distances, or skipping some SSMs when a processing time is tight, besides taking the average value of several preceding consecutive SSM distance errors. It is confirmed with a practical magnetic disk apparatus that variation in several preceding and following SSM distances is small enough for the required accuracy.

Next, N_sms_old, N_err and the like are stored in the disk synchronous write information storage unit 113 as N_sms_old=N_sms_new for the next calculation. Finally, a value F_err/(S_flp_lsb) is set in the frequency offset register 14, and posted to the RDC 10 as frequency deviation information (step S508).

As described above, in the present embodiment, the write linking judging unit 111 of the HDC 100 judges whether the servo frame is in the servo write linking position, depending on whether the SSM is of the special pattern. When the servo frame is not in the servo write linking position, the disk synchronous writing unit 112 allows the disk synchronous write function of the RDC 10 to be operated. When the servo frame is in the servo write linking position, the write linking processing unit 114 instructs the RDC 10 to carry out data read/write using the predetermined frequency for write linking position. Therefore, the GAP 20 can be eliminated from the ordinary servo frame, and thus the recording density can be eased.

In the present embodiment, the case has been explained in which data read/write is carried out using the clocks of the predetermined frequency for write linking position without using the disk synchronous write function in a servo write linking position. However, the present invention is not limited to the above, and can be similarly applied to a case where, for example, the disk synchronous write function is used in a servo write linking position.

Figure 7:
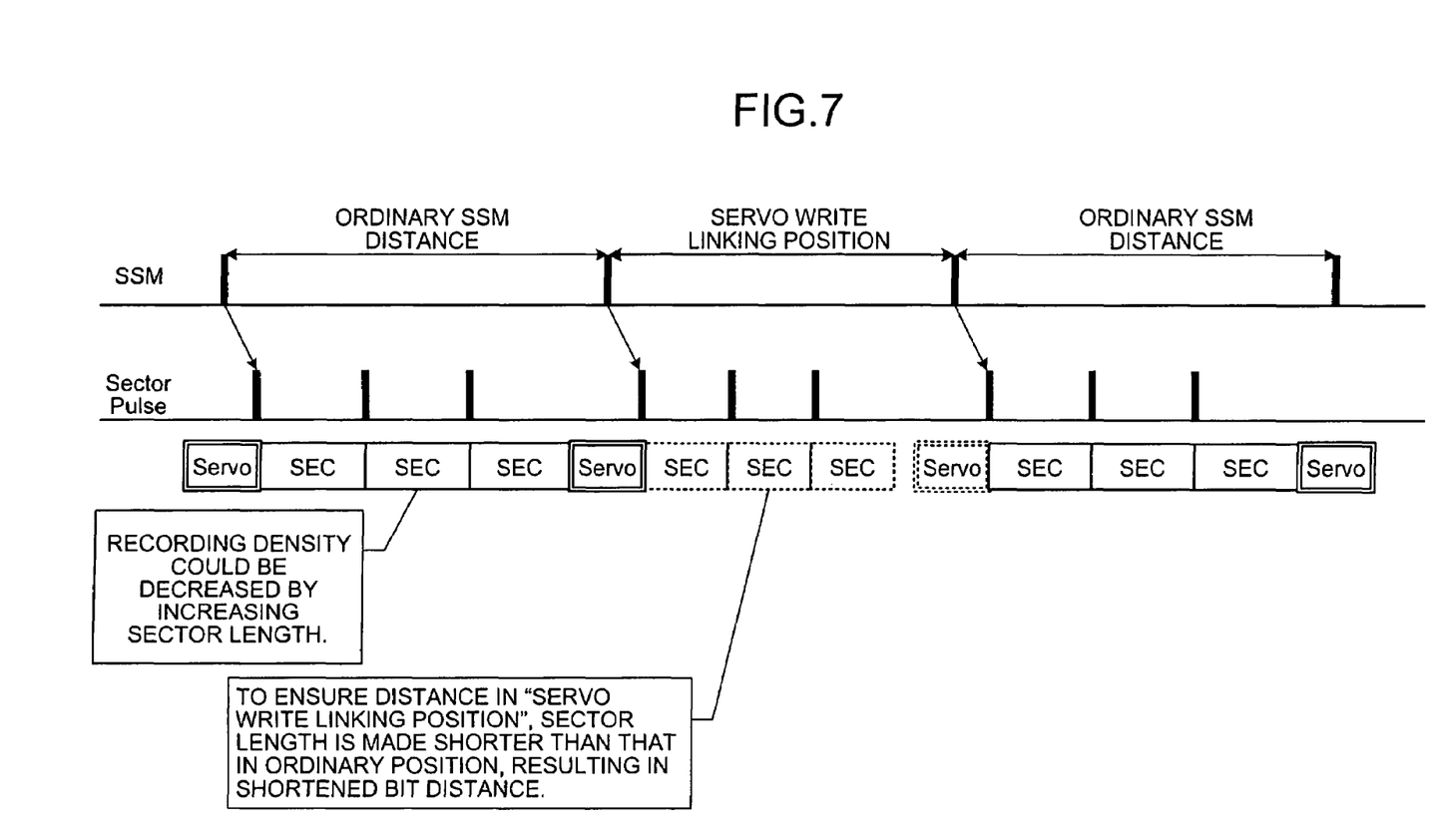
FIG. 7 illustrates a recording format when a disk synchronous write function is used even in a servo write linking position.

FIG. 7 illustrates a recording format when the disk synchronous write function is used even in a servo write linking position. As shown in FIG. 7, in this recording format, a necessary gap is ensured by shortening the sector length in the servo write linking position than that in the ordinary position.

In this case, the controlling unit 110 sets F_err/(S_flp_lsb)×A % in the frequency offset register 14 to allow the disk synchronous write function of the RDC 10 to be operated in place of processing of the step S404 in FIG. 4. Here, A % is a constant to multiply to correspond to the sector length shorter than the ordinary sector length. It is necessary to adjust the counter number of the sector pulse generating unit 120 that generates sector pulses in response to the shorter sector length.

Further, in the present embodiment, the case in which the length of servo frame in the servo write linking position is shorter than that of the ordinary servo frame has been explained; however, the present invention can be similarly applied to a case in which it is not known whether a length of servo frame in a servo write linking position is longer than that of an ordinary servo frame.

In other words, when it is not known whether the length of servo frame in the servo write linking position is longer or shorter than that of the ordinary servo frame, the controlling unit 110 first judges whether the length of servo frame in the servo write linking position is longer or shorter than that of the ordinary servo frame in place of the processing of the step S404 in FIG. 4. When the servo frame is shorter, the controlling unit 110 instructs the RDC 10 to carry out data read/write using a predetermined frequency for servo write linking position, or sets F_err/(S_flp_lsb)×A % in the frequency offset register 14 to allow the disk synchronous write function of the RDC 10 to be operated. When the servo frame is not shorter, the controlling unit 110 allows the disk synchronous write function of the RDC 10 to be operated.

Furthermore, the process executed by the controlling unit 110 of the HDC 100 according to the present embodiment may be realized by software, whereby the software executes a medium recording and playback control program having the similar function. A computer that executes the medium recording and playback control program is explained next.

Figure 8:
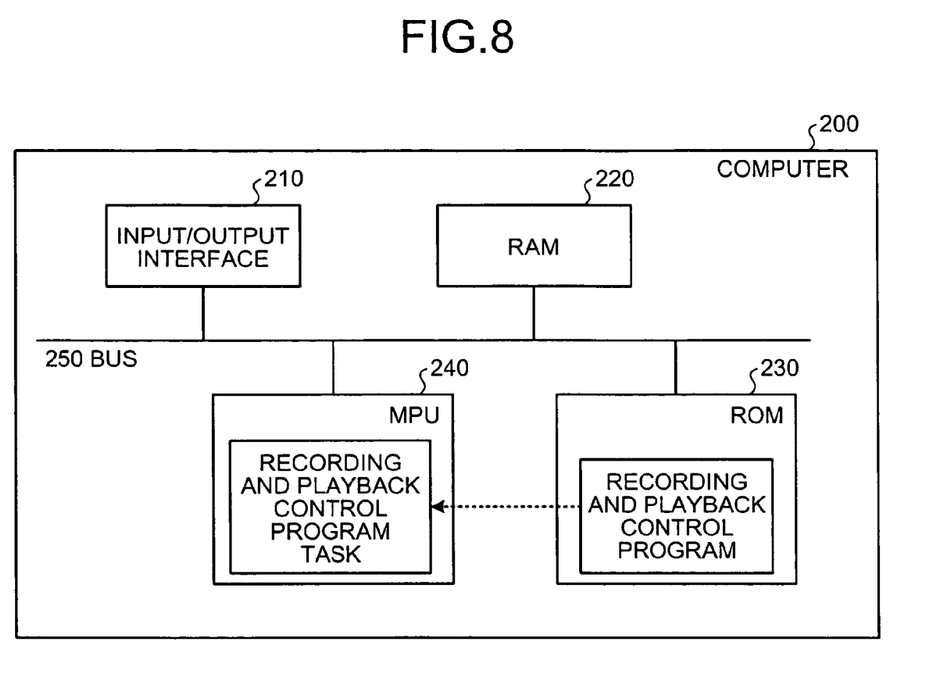
FIG. 8 illustrates a computer that executes a medium recording and playback control program.

FIG. 8 illustrates a computer that executes the medium recording and playback control program according to the present embodiment. As shown in FIG. 8, the computer 200 includes an input/output interface 210, a random access memory (RAM) 220, a read only memory (ROM) 230, and a microprocessor unit (MPU) 240, and these are connected to one another via a bus 250.

The input/output interface 210 is used to send and receive data from the RDC 10, the sector pulse generating unit 120, and the like. The RAM 220 is a memory that stores results during the processing and the like by the MPU 240.

The ROM 230 is a memory exclusively used for read-out, and stores the medium recording and playback control program and the constants. The MPU 240 executes the medium recording and playback control program.

According to the present invention, gaps can be removed from the ordinary servo frames.

Moreover, the recording density can be eased, and the format efficiency can be enhanced.

Furthermore, the servo information in the servo write linking position is prevented from being overwritten with data.

Moreover, it is possible to use the medium synchronous write function even in the servo write linking position.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A medium reading and writing apparatus comprising:
    a write linking position judging unit that judges whether a servo frame for reading/writing data is in a servo write linking position, wherein the servo write linking position is one of extra space or insufficient space generated at the last servo frame when servo synchronous marks on a track are equidistant, after one rotation of the track; and
    a data reading/writing unit that reads/writes the data using a medium synchronous write function, where a frequency of a clock used for reading/writing the data is corrected based on a distance between servo synchronous marks, if the write linking position judging unit judges that the servo frame is not in the servo write linking position, and reads/writes the data based on the clock of a predetermined frequency that is for the servo write linking position, if the write linking position judging unit judges that the servo frame is in the servo write linking position by detecting a special pattern in the servo frame.

2. The medium reading and writing apparatus according to claim 1, wherein
    the medium synchronous write function corrects the frequency of the clock by determining a frequency correction quantity, and multiplying the frequency correction quantity by a constant; and
    the data reading/writing unit reads/writes the data after the medium synchronous write function corrects the frequency of the clock, if the write linking position judging unit judges the servo frame is not in the servo write linking position.

3. The medium reading and writing apparatus according to claim 1, wherein when the data reading/writing unit reads/writes the data using the medium synchronous write function, the data reading/writing unit computes a correction amount using an average of a plurality of frequency errors calculated based on the distances of a plurality of past servo synchronous marks.

4. The medium reading and writing apparatus according to claim 1, wherein the write linking position judging unit makes the judgment using specific servo synchronous marks.

5. The medium reading and writing apparatus according to claim 1, wherein the write linking position judging unit makes the judgment using a repeatable run out area that is included in the servo frame.

6. A medium reading and writing method applied to a medium reading and writing apparatus, comprising:
    judging whether a servo frame for reading/writing data is in a servo write linking position, wherein the servo write linking position is one of extra space or insufficient space generated at the last servo frame when servo synchronous marks on a track are equidistant, after one rotation of the track;
    reading/writing the data using a medium synchronous write function, where a frequency of a clock used for reading/writing the data is corrected based on a distance between servo synchronous marks, if it is judged at the judging that the servo frame is not in the servo write linking position; and
    reading/writing the data based on the clock of a predetermined frequency that is for the servo write linking position, if the write linking position judging unit judges that the servo frame is in the servo write linking position by detecting a special pattern in the servo frame.

7. A computer readable medium storing a computer program product that implements on a computer a medium reading and writing method comprising:
    judging whether a servo frame for reading/writing data is in a servo write linking position, wherein the servo write linking position is one of extra space or insufficient space generated at the last servo frame when servo synchronous marks on a track are equidistant, after one rotation of the track;
    reading/writing the data using a medium synchronous write function, where a frequency of a clock used for reading/writing the data is corrected based on a distance between servo synchronous marks, if it is judged at the judging that the servo frame is not in the servo write linking position; and
    reading/writing the data based on the clock of a predetermined frequency that is for the servo write linking position, if the write linking position judging unit judges that the servo frame is in the servo write linking position by detecting a special pattern in the servo frame.

8. A medium reading and writing apparatus comprising:
    a write linking position judging unit that judges whether a servo frame for reading/writing data is in a servo write linking position; and
    a data reading/writing unit that reads/writes the data using a medium synchronous write function, where a frequency of a clock used for reading/writing the data is corrected based on a distance between servo synchronous marks, if the write linking position judging unit judges that the servo frame is not in the servo write linking position, or if the write linking position judging unit judges that the servo frame is in the servo write linking position and that a length of the servo write linking position is longer than the length of other servo frames, and reads/writes the data based on the clock of a predetermined frequency that is meant for the servo write linking position, if the write linking position judging unit judges that the servo frame is in the servo write linking position and that a length of the servo write linking position is shorter than the length of other servo frames by detecting a special pattern in the servo frame.

* * * * *